United States Patent
Heenan et al.

(10) Patent No.: US 12,068,463 B2
(45) Date of Patent: Aug. 20, 2024

(54) METHOD OF ENHANCING ELECTROCHEMICAL CELL PERFORMANCE

(71) Applicant: UCL Business Limited, London (GB)

(72) Inventors: Thomas Heenan, London (GB); Paul Shearing, London (GB); Daniel Brett, London (GB); Chun Tan, London (GB)

(73) Assignee: UCL Business Limited, London (GB)

(*) Notice: Subject to any disclaimer, the term of this patent is extended or adjusted under 35 U.S.C. 154(b) by 529 days.

(21) Appl. No.: 17/420,832

(22) PCT Filed: Jan. 6, 2020

(86) PCT No.: PCT/EP2020/050145
§ 371 (c)(1),
(2) Date: Jul. 6, 2021

(87) PCT Pub. No.: WO2020/144142
PCT Pub. Date: Jul. 16, 2020

(65) Prior Publication Data
US 2022/0093981 A1    Mar. 24, 2022

(30) Foreign Application Priority Data
Jan. 7, 2019 (GB) ..................... 1900171

(51) Int. Cl.
*H01M 10/44* (2006.01)
*H02J 7/12* (2006.01)

(52) U.S. Cl.
CPC ............... *H01M 10/44* (2013.01); *H02J 7/12* (2013.01)

(58) Field of Classification Search
CPC ............ H01M 10/44; H02J 7/12; Y02E 60/10
See application file for complete search history.

(56) References Cited

U.S. PATENT DOCUMENTS

| | | | |
|---|---|---|---|
| 2004/0200731 A1* | 10/2004 | Sullivan | C25B 15/00 205/628 |
| 2010/0159293 A1 | 6/2010 | Hempel | |
| 2012/0184338 A1* | 7/2012 | Kesler | H04B 5/0037 455/343.1 |
| 2018/0019496 A1* | 1/2018 | Konopka | C25D 5/67 |
| 2022/0093981 A1* | 3/2022 | Heenan | H01M 10/44 |

FOREIGN PATENT DOCUMENTS

| | | | |
|---|---|---|---|
| EP | 3033796 | 6/2016 | |
| EP | 3033796 B1 * | 8/2018 | ............ H01G 11/08 |
| JP | H06084544 | 3/1994 | |
| JP | 2017017887 | 1/2017 | |

OTHER PUBLICATIONS

International Searching Authority. International Search Report and Written Opinion for application PCT/EP2020/050145. Mailed on Apr. 21, 2020. 12 pages.

* cited by examiner

*Primary Examiner* — Abdullah A Riyami
*Assistant Examiner* — Nader J Alhawamdeh
(74) *Attorney, Agent, or Firm* — Quarles & Brady, LLP

(57) ABSTRACT

A method of enhancing performance of an electrochemical cell having a first electrode and a second electrode and electrolyte between the first and second electrodes. The first and second electrodes define a current flow path and the method comprises providing a changing magnetic field through the cell.

14 Claims, 10 Drawing Sheets

METHOD OF ENHANCING ELECTROCHEMICAL CELL PERFORMANCE

CROSS-REFERENCE TO RELATED APPLICATIONS

The present application represents the United States National Stage of International Application No. PCT/EP2020/050145, filed Jan. 6, 2020, which relates to and claims priority to British Patent Application Serial No. GB 1900171.8, filed Jan. 7, 2019, both of which are incorporated herein by reference in their entirety.

FIELD OF THE INVENTION

The present invention relates to the performance of electrochemical cells and particularly, although not exclusively, to increasing the speed of charge and discharge and the capacity of electrochemical cells.

BACKGROUND

Electrochemical cells are vital to many electrical systems, in particular portable devices such as mobile phones and laptops and, increasingly, electric vehicles.

The portability of electronic devices/vehicles are dependent on the performance of their cells. In general it is desirable to have a cell that has a large capacity and a short charging time to increase the ratio of time that the devices/vehicles can operate independently of an external power source to time that they must be connected to an external power source for charging.

Various types and configurations of electrochemical cells can be selected based on size, shape, voltage, current and other requirements. Examples of common shapes of cells are pouch cells, cylindrical cells, Swagelok cells and coin cells. The cells may also be connected in a battery to provide the appropriate voltage and/or current for the application.

If a cell is charged too quickly, many undesirable operation conditions can occur; such as: dendrite formation, metallic plating and current hot-spots, each of which can potentially increase the likelihood of a short circuit and damage to the cell.

A common method of quickly charging a cell while avoiding over-charging is to supply a constant current in a first charging phase until a predetermined voltage is reached in the cell and then, in a second charging phase, holding the voltage constant while the current decays to ensure the cell reaches capacity. The first charging phase quickly increases the charge in the cell and the second charging phase is slower.

A C-rate is a measure of the rate of charge or discharge of a cell and is the current divided by the capacity and with units of per hour.

The present invention has been devised in light of the above considerations.

SUMMARY OF THE INVENTION

The present invention provides a method of enhancing performance of an electrochemical cell having a first electrode and a second electrode and electrolyte between the first and second electrodes, the first and second electrodes defining a current flow path, the method comprising providing a changing magnetic field through the cell.

The changing magnetic field aids ion transport in the electrochemical cell thereby meaning that performance of the battery is enhanced. Optionally, the cell may include a separator between the electrodes. The transport of ions can be improved in the electrolyte and/or in the electrodes and/or in the separator. The changing magnetic field through the cell means that the magnetic flux in the cell varies over time in magnitude and/or direction and/or distribution.

One characteristic of the cell which can be enhanced using the above method is the speed of charging of the cell. Ion transport in cells is often the rate determining process during charging and so aiding the transport of ions speeds up charging of the cell. Another characteristic of the cell which can be enhanced using the above method is the speed of discharging as ion transport is improved in an analogous way to during charging. Another characteristic of the cell which can be enhanced using the above method is the capacity of the cell. This may be achieved by performing the method above on the cell during formation of the cell or during operation.

The changing magnetic field may be a rotating magnetic field and/or an oscillating magnetic field and/or a pulsing magnetic field.

The changing magnetic field may have a direction with a component perpendicular to the current flow path. The changing magnetic field may have a direction with a component parallel to the current flow path.

Rotation of the magnetic field may be around an axis having a component perpendicular to a direction of the magnetic field. The rotation of the magnetic field may be around an axis having a component parallel to a direction of the magnetic field.

Rotation of the magnetic field may be around an axis having a component perpendicular to a direction of the current flow path. The rotation of the magnetic field may be around an axis having a component parallel to a direction of the current flow path.

The rotating magnetic field may be provided by a spinning permanent magnet, or a temporary magnet, or electromagnet or may be provided by an array of electromagnets which are sequentially activated to effectively rotate the magnetic field.

The electrochemical cell may be a battery. The battery may be a coin cell, a cylindrical cell, a prismatic cell or a pouch cell.

The battery may be a positive ion battery and the current flow path may be the direction of travel of positive ions. The battery may be a lithium-ion battery. Alternatively, the battery may be a negative ion battery and the current flow path may be the direction of travel of negative ions.

The cell may be for powering an electric vehicle, a mobile phone, a laptop computer, tablet or other portable or stationary device. The cell may be a fuel cell.

The electrochemical cell may be part of an array of two or more cells.

The magnetic field may be provided by a permanent magnet or temporary magnet or an electromagnet.

The electrolyte may be a solid, liquid or a gel. In particular, the electrolyte may be non-aqueous including organic electrolytes.

A magnetic field generator may be provided for generating the changing magnetic field. The magnetic field generator may be within the cell or external to the cell.

In another aspect, the present invention provides a charge accelerator for enhancing performance of an electrochemical cell, the device being configured to carry out a method of enhancing performance of an electrochemical cell described above.

In another aspect, the present invention provides a method of charging an electrochemical cell comprising the steps of providing a current or voltage to the cell from a power source whilst performing a method of enhancing performance of an electrochemical cell described above. In this disclosure, charging a cell includes moving ions in a cell whether imposed by a current or voltage or by spontaneous movement of the ions.

In another aspect, the present invention provides a method of discharging an electrochemical cell comprising the steps of extracting a current or voltage from the cell whilst performing a method of enhancing performance of an electrochemical cell described above.

In another aspect, the present invention provides a method of enhancing capacity of an electrochemical cell comprising the steps of forming or during operation of an electrochemical cell whilst performing a method of enhancing performance of an electrochemical cell described above.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 2 shows a diagram of an example arrangement used to enhance the performance of a pouch cell.

FIG. 10 shows a diagram of an example arrangement used to enhance the performance of a Swagelok-type cell.

FIG. 13 shows a diagram of an example arrangement used to enhance the performance of a cylindrical-type cell.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
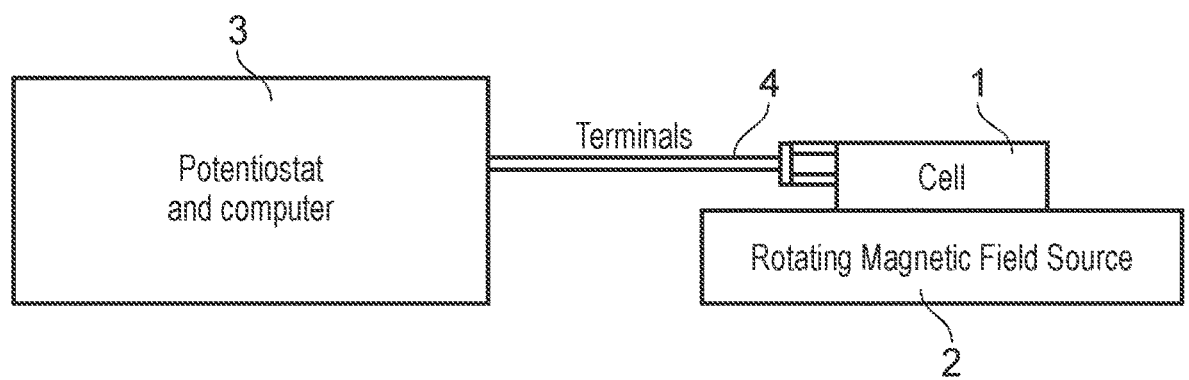
FIG. 1 shows a side view of an example arrangement of equipment used in enhancing the performance of a cell.

The arrangement of equipment shown in FIG. 1 can be used to enhance and monitor the performance of a cell 1 while charging or discharging. The cell 1 is located on top of a rotating magnetic field generator 2. The cell 1 is connected to the potentiostat and computer 3 via terminals 4. The potentiostat controls the potential across the cell 1 and may charge or discharge the cell 1. The computer monitors the current, and/or capacity and/or voltage of the cell 1. The rotating magnetic field generator 2 provides a rotating magnetic field through the cell 1.

This arrangement can be used for testing the cell, but when monitoring of the cell 1 is not required, the potentiostat, computer 3 and terminals 4 can be removed and optionally replaced by a power source or drain for charging or discharging the cell.

In the arrangement of FIG. 1, the cell 1 is located on top of the rotating magnetic field generator 2, but in other embodiments of the invention, the cell 1 and rotating magnetic field generator 2 may be oriented differently as long as the rotating magnetic field generator 2 can produce a magnetic field through the cell 1.

Figure 2A:
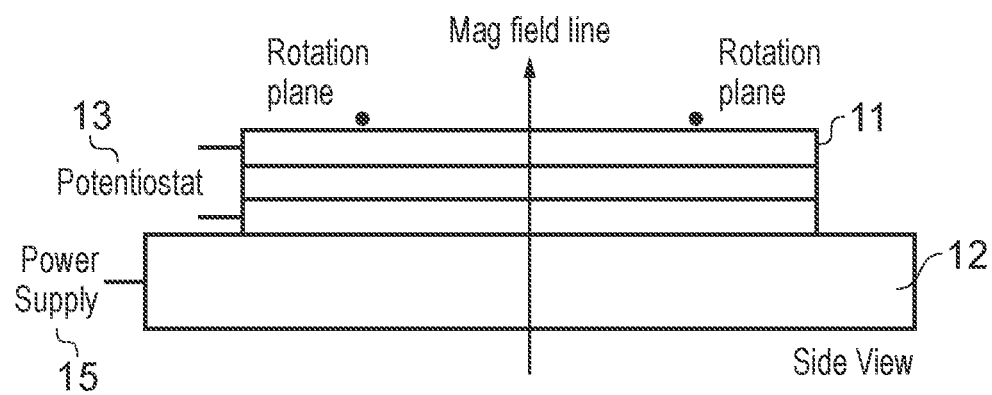
FIG. 2A shows a cross-sectional side view and FIG. 2B shows a top view.
Figure 2B:
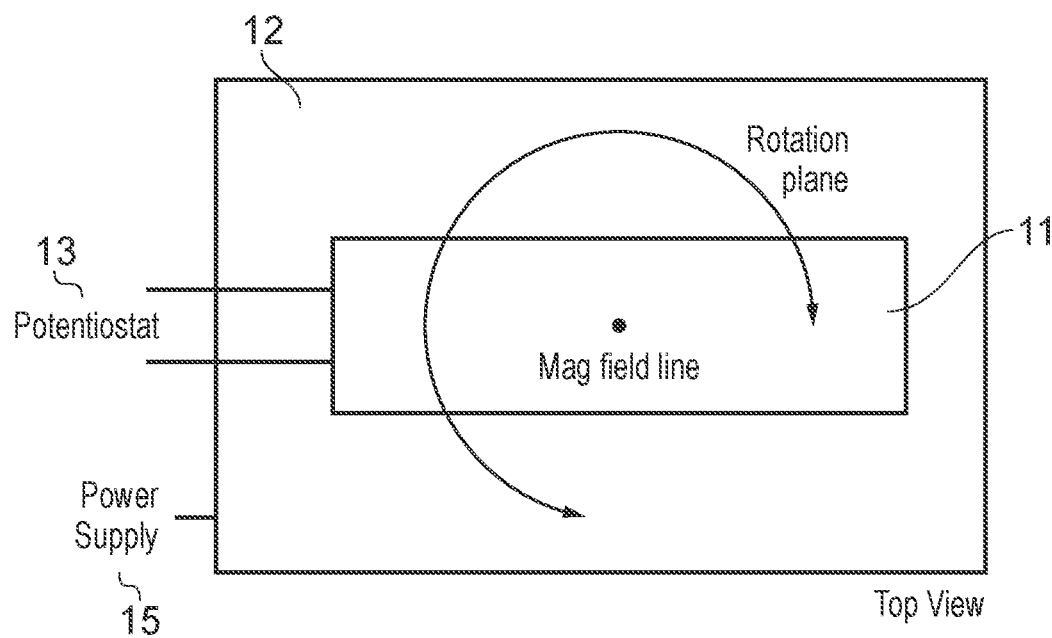

The rotation of the magnetic field may be around an axis substantially parallel to the direction of the magnetic field produced. For example, the direction of the magnetic field produced in the cell 1 may be substantially parallel to a direction between the magnetic field generator 2 and the cell 1 and the rotation of the field may be around an axis parallel to a direction between the magnetic field generator 2 and the cell 1 as shown in FIGS. 2A and 2B.

Alternatively, the rotation magnetic field may be around an axis substantially perpendicular to the direction of the magnetic field produced. For example, the direction of the magnetic field produced in the cell 1 may be substantially perpendicular to a direction between the magnetic field generator 2 and the cell 1 and the rotation of the field may be around an axis parallel to a direction between the magnetic field generator 2 and the cell 1.

The rotating magnetic field generator 2 in the arrangement of FIG. 1, may be replaced with a changing magnetic field generator that produces a changing magnetic field that varies in another way. For example, a changing magnetic field generator may be used in to produce a magnetic field that rotates and/or oscillates and/or pulses.

The following examples of apparatuses and methods show the effect of changing magnetic fields on the charging of several commercially available batteries. All of the examples show reduced time to charge the cells in the presence of a changing magnetic field. The cells are of various geometries and chemical make ups and are described in more detail below.

In this disclosure, the term "under field conditions" refers to the presence of a changing magnetic field. In the examples explained below, results for charging the cells in the presence of a changing magnetic field are shown along with comparative examples of the cells in the absence of a changing magnetic field. The arrangements used in the examples and in the comparative examples differ only in that the magnetic field provided in the comparative examples is constant in direction and magnitude, whereas the magnetic field provided in the examples is changing.

FIG. 2 shows an arrangement used to enhance performance of a pouch cell 11. The magnetic field generator 12 produces a magnetic field having a direction parallel to the direction shown by the arrow in FIG. 2A. The magnetic field produced rotates in the direction shown by the arrow in FIG. 2B. The magnetic field passes through pouch cell 11.

The magnetic field be offset from the axis of rotation to ensure that the magnetic flux in the cell changes over time.

The magnetic field generator 12 is an electromagnet powered by power supply 15. Potentiostat 13 is connected to the pouch cell 11 and controls the potential over the cell and can be used to charge or discharge the cell.

The pouch cell 11 is formed of a first electrode and a second electrode separated from one another by an electrolyte. The electrodes are substantially parallel and extend across a length and width of the cell. The pouch cell 11 has contacts for each of the electrodes which may be connected to a potentiostat as shown in FIG. 2.

The pouch cell 11 is oriented so that the direction of the magnetic field passes through the first electrode of the cell, through the electrolyte and through the second electrode. The direction of the magnetic field is parallel to the direction of a current path between the electrodes. The rotation plane of the magnetic field is parallel to the planes of the electrodes.

Figure 3:
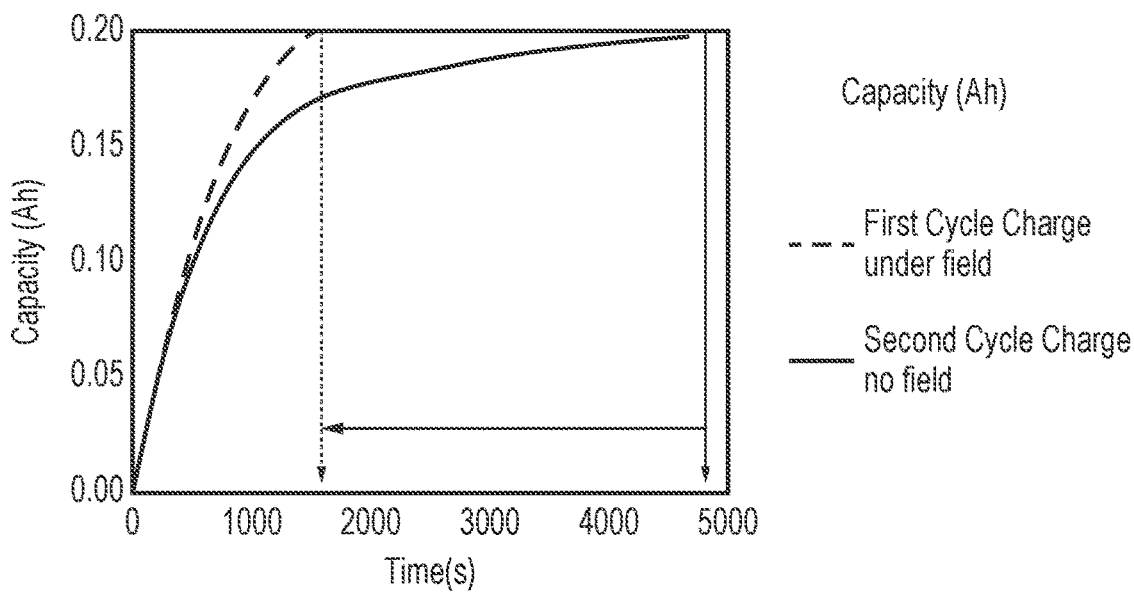
FIG. 3 shows capacity of a cell over time of a pouch cell when charged from 3.4 V to 4.2 V at 0.841 A until 4.2 V was reached then held at constant voltage while the current decays and capacity is reached (i) with a changing magnetic field (dashed line) and (ii) with a permanent magnetic field (solid line).

FIG. 3 shows the capacity of pouch cell 11 when charged in the presence of a magnetic field produced by the magnetic field generator 12 when the field is (i) rotating (shown by the dashed line) and (ii) not rotating (shown by the solid line). The pouch cell 11 was charged in two phases. In the first phase, the cell was charged from 3.4V to 4.2V at 0.841 A until 4.2V was reached and then in the second phase, the cell was held at constant voltage while the current decayed and capacity was reached.

Figure 4:
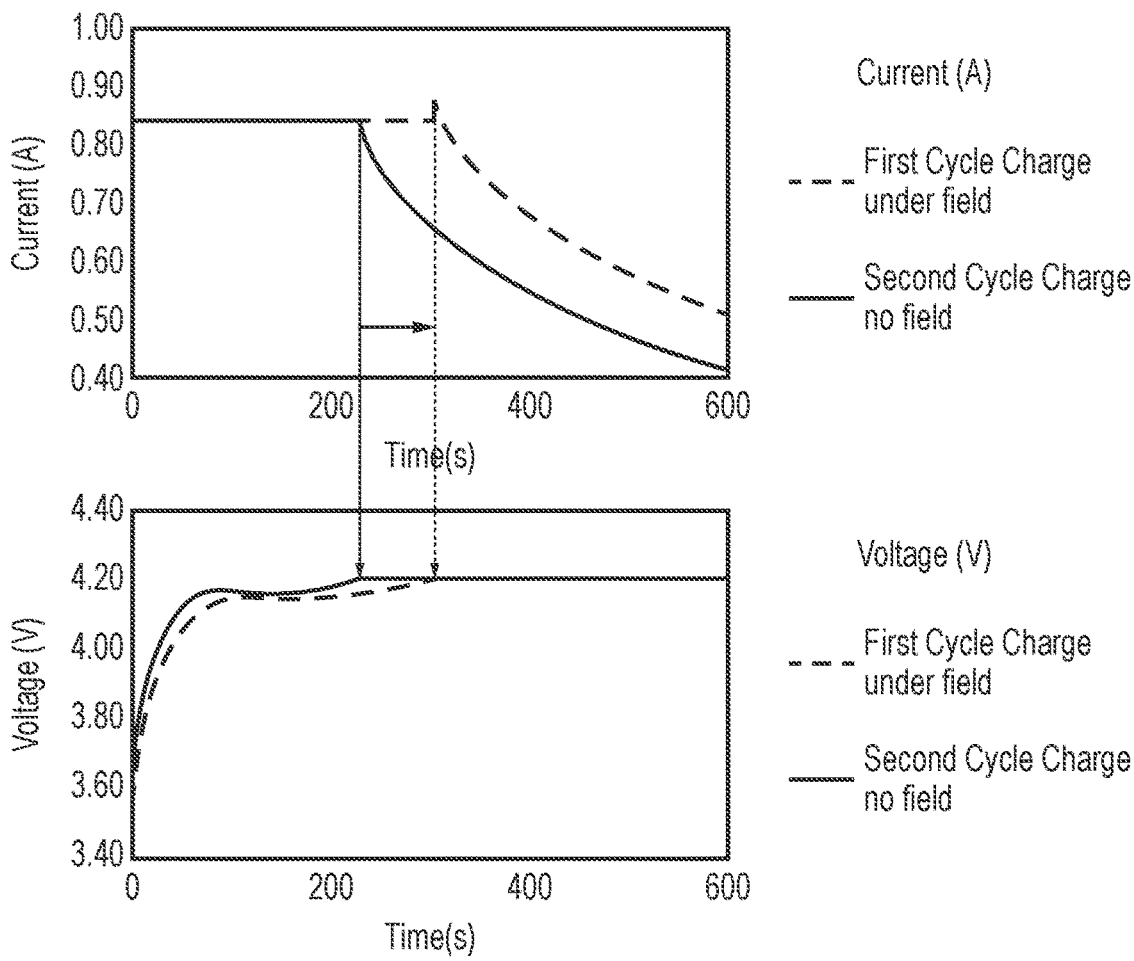
FIG. 4 shows current and voltage over time of the pouch cell charged from 3.4 V to 4.2 V at 0.841 A until 4.2 V was reached then held at constant voltage while the current decays and capacity is reached (i) with a rotating magnetic field present (dashed line) and (ii) with a permanent magnetic field (solid line).

The first phase where a constant current is applied to the cell can be seen by the horizontal line portions of the current graph in FIG. 4. The second phase where voltage is held constant and current decays while full capacity is reached can be seen where the current changes. The straight horizontal lines to t=220 and 300 seconds for no changing field and changing field respectively, represent the constant current portion of the charging and t onwards representing the constant voltage portion of the charging.

A magnetic field was produced by an electromagnet in the magnetic field generator 12. During the cycle shown by the dashed line, the electromagnet was spun at 1160 rpm. The results show that the time taken to charge the cell was reduced by 68% by the presence of the rotating magnetic field.

FIG. 4 shows the current and voltage during the charging of the pouch cell 11 in the conditions described in relation to FIG. 3. Again, the dashed line shows the charge when the magnetic field is rotating and the solid line shows charging when the magnetic field is not rotating (it is constant). The graphs show that, in the presence of a rotating magnetic field, the time taken to reach the voltage of 4.2V is increased so that the first phase of charging where current is applied is maintained for a longer period. As the first phase of charging increases the charge held by the cell more quickly than the second phase, this means that charging overall is quicker when the rotating magnetic field is present through the cell.

Figure 5:
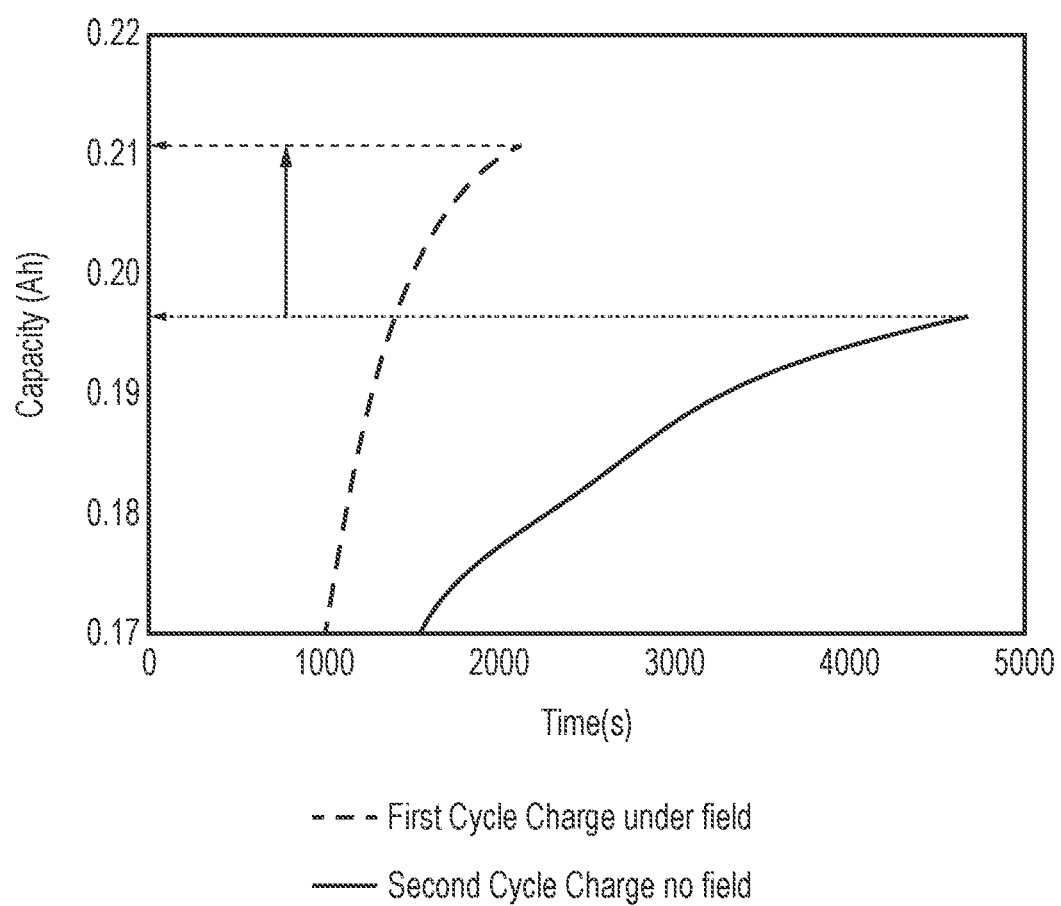
FIG. 5 shows capacity of a cell over time of the pouch cell when charged from 3.4 V to 4.2 V at 0.841 A until 4.2 V was reached then held at constant voltage while the current decays and capacity is reached (i) with a rotating magnetic field present (dashed line) and (ii) with a permanent magnetic field (solid line).

FIG. 5 shows the capacity of the pouch cell 11 when charged in the presence of a magnetic field produced by magnetic field generator 12 when the field is (i) rotating (shown by the dashed line) and (ii) not rotating (shown by the solid line). The pouch cell 11 was charged in two phases. In the first phase, the cell was charged from 3.4V to 4.2V at 0.841 A until 4.2V was reached and then in the second phase, the cell was held at constant voltage while the current decayed and capacity was reached.

As can be seen in FIG. 5, in both cycles the cells were charged to 4.2V, but in the cycle where the magnetic field was rotating, the capacity of the cell was increased by 5%. The speed of charge was also increased by the rotation of the magnetic field.

Figure 6:
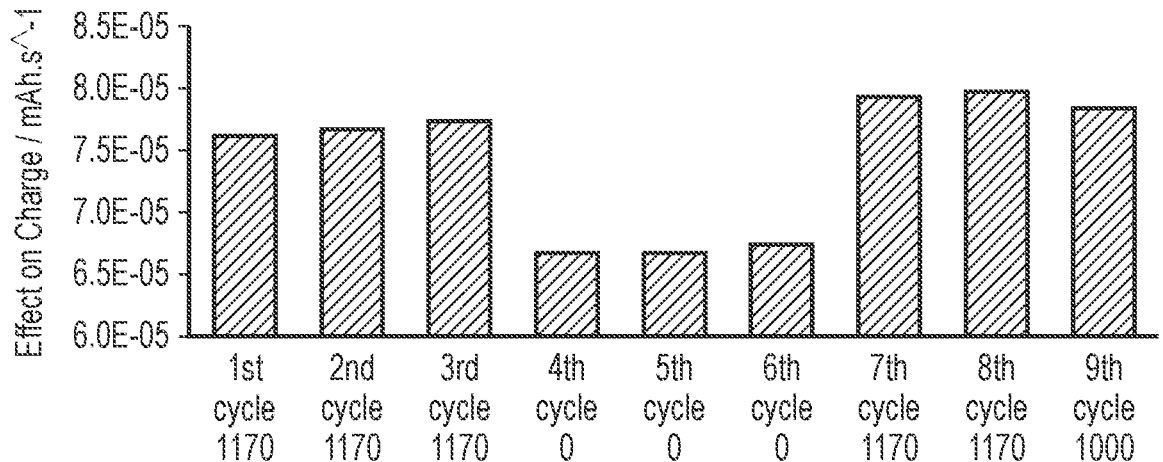
FIG. 6 shows the speed of charging of a 400 mAh pouch cell in cycles with a rotating magnetic field and with a permanent a magnetic field.

FIG. 6 shows results of testing a pouch cell 21. The pouch cell 21 has a 400 mAh capacity and has dimensions of 5 cm by 2 cm by 0.5 cm. The pouch cell 21 is commercially available via the part information: +PL-402248-2C, 3.7V 400 mAh −PO 7006 20140726.

The rate of charge of the pouch cell 21 is shown in FIG. 6 for nine charge cycles. Cycles 1 to 3, 7 and 8 were in the presence of a magnetic field rotating at 1170 rpm and cycle 9 was in the presence of the magnetic field rotating at 1000 rpm. Cycles 4 to 6 were in the presence of a static magnetic field.

As can be seen in FIG. 6, the rate of charging was consistently increased by the rotation of the magnetic field by around 15%.

Figure 7:
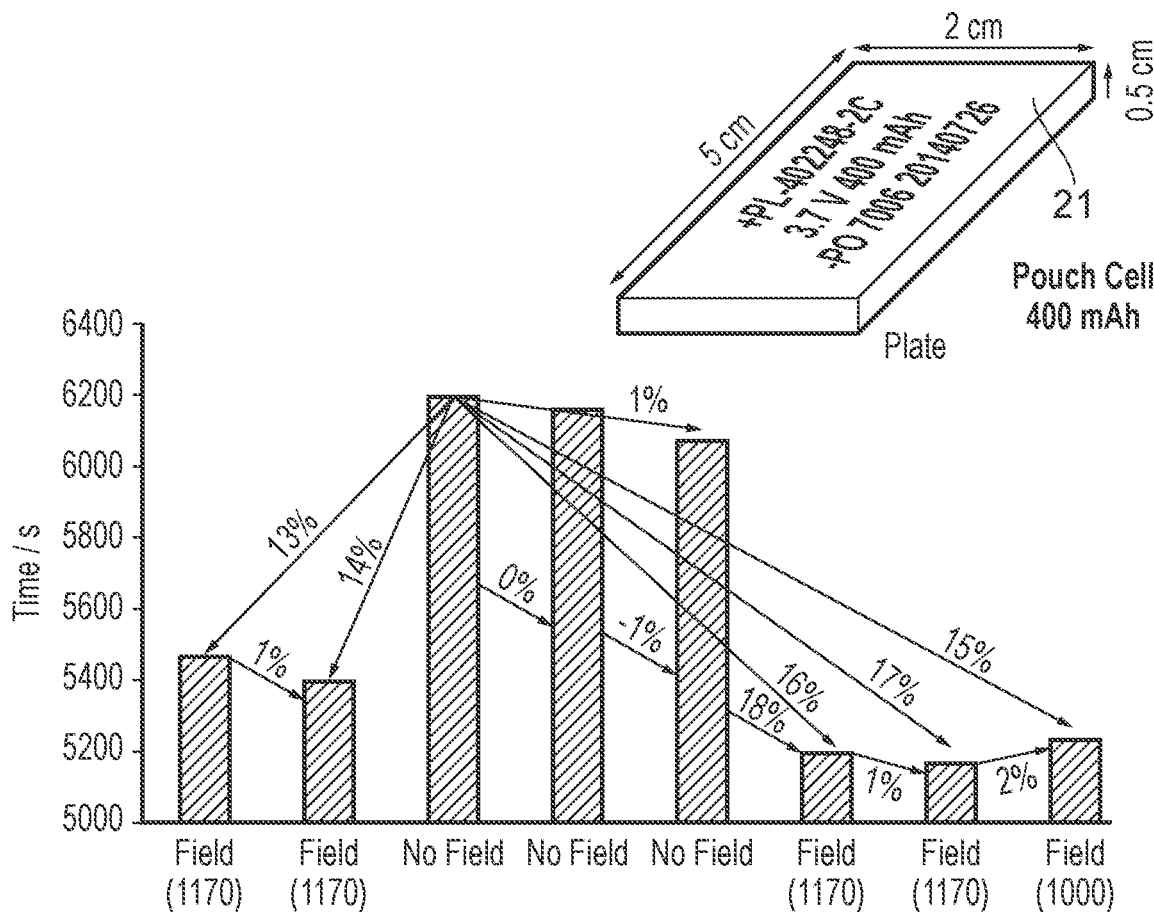
FIG. 7 shows the time taken to charge the 400 mAh pouch cell of FIG. 6 with a rotating magnetic field and with a permanent a magnetic field along with dimensions and properties of the cell used.

FIG. 7 shows the time taken to charge pouch cell 21 in eight charge cycles with a rotating field at 1170 rpm, a rotating field at 1000 rpm, and a static magnetic field (labelled 'no field' in the figure). As can be seen in FIG. 7, the time taken to charge the cell is consistently decreased by around 15% in the presence of a rotating magnetic field.

Figure 8:
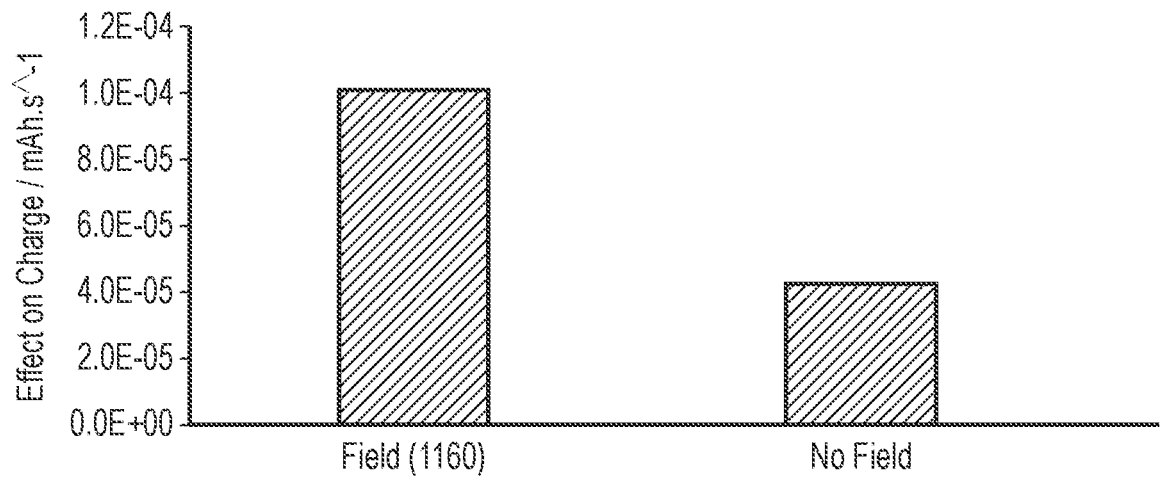
FIG. 8 shows the speed of charging of a 200 mAh pouch cell at 4C with a rotating magnetic field and with a permanent a magnetic field.

FIG. 8 shows results of testing a pouch cell 31. The pouch cell 31 has a 200 mAh capacity and has dimensions of 2.5 cm by 1.7 cm by 0.5 cm. The pouch cell 31 is commercially available via the part information: −PL-651628-2C, 3.7V 210 mAh +PO 7994.

The rate of charge of the pouch cell 31 is shown in FIG. 8 for two charge cycles. The first cycle was in the presence of a magnetic field rotating at 1160 rpm and the second cycle was in the presence of a static magnetic field.

As can be seen in FIG. 8, the rate of charging was dramatically increased by the rotation of the magnetic field.

Figure 9:
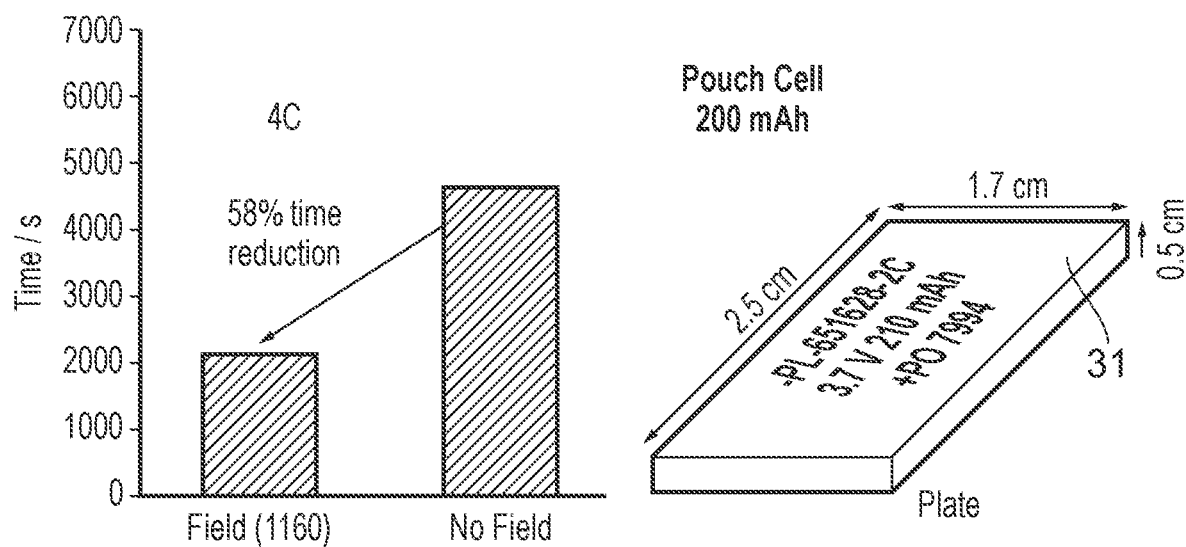
FIG. 9 shows the time taken to charge the 200 mAh pouch cell of FIG. 8 with a rotating magnetic field and with a permanent a magnetic field at 4C along with dimensions and properties of the cell used.

FIG. 9 shows the time taken to charge pouch cell 31 in a charge cycle with a rotating field at 1160 rpm, and a static magnetic field (labelled 'no field' in the figure). As can be seen in FIG. 9, the time taken to charge the cell at 4C is decreased by 58% in the presence of a rotating magnetic field.

Figure 10A:
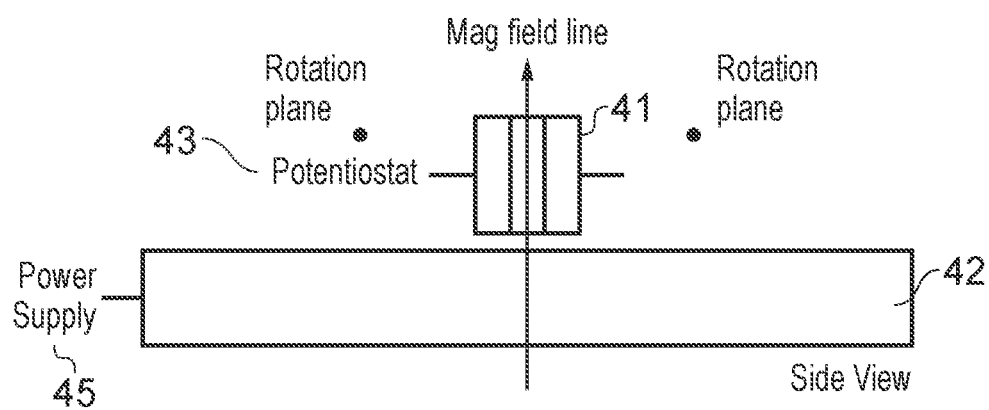
FIG. 10A shows a cross-sectional side view and FIG. 10B shows a top view.
Figure 10B:
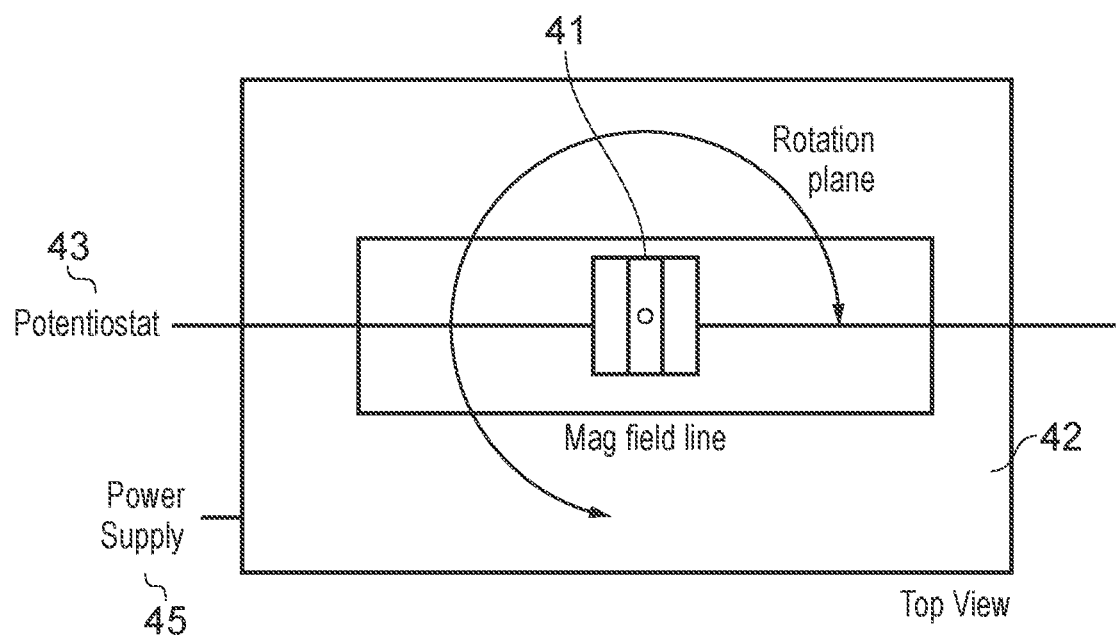

FIG. 10 shows an arrangement used to enhance performance of a Swagelok-type cell 41. The magnetic field generator 42 produces a magnetic field having the direction parallel to the direction shown by the arrow in FIG. 10A. The magnetic field produced rotates in the direction shown by the arrow in FIG. 10B. The magnetic field passes through Swagelok cell 41.

The magnetic field be offset from the axis of rotation to ensure that the magnetic flux in the cell changes over time.

The magnetic field generator 42 is an electromagnet powered by power supply 45. Potentiostat 43 is connected to the Swagelok cell 41 and controls the potential over the cell and can be used to charge the cell.

The Swagelok cell 41 is formed of a first electrode and a second electrode separated from one another by an electrolyte and separator material. The electrodes are substantially parallel and extend across a length and width of the cell. The Swagelok cell 41 has contacts for each of the electrodes which may be connected to a potentiostat as shown in FIG. 10.

The Swagelok cell 41 is oriented so that the direction of the magnetic field passes through the cell, perpendicularly to the direction of a current path between the electrodes. The rotation plane of the magnetic field is perpendicular to the planes of the electrodes.

Figure 11:
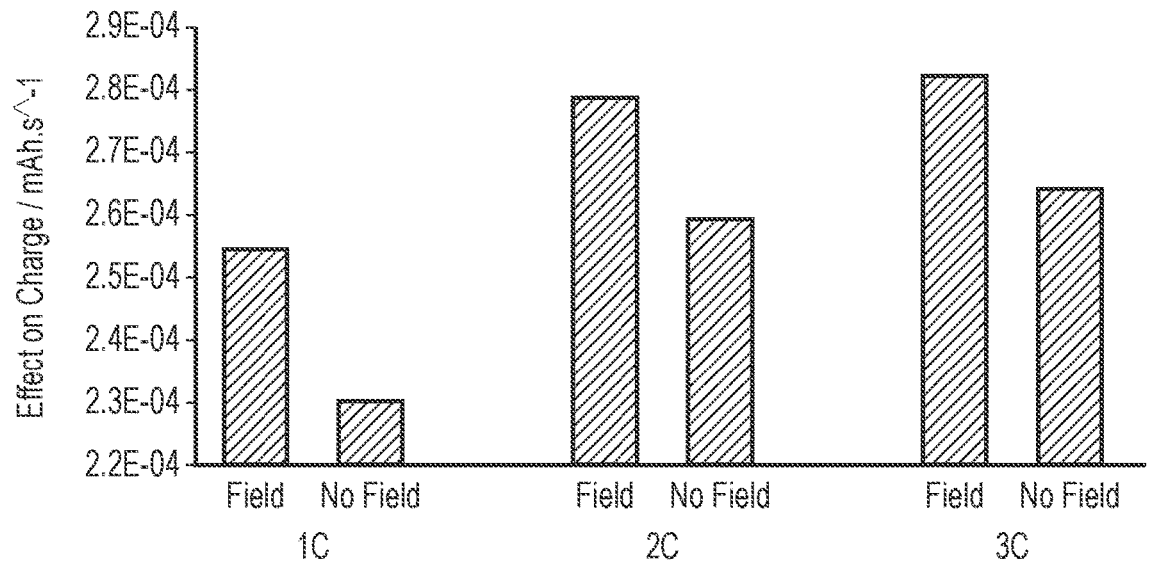
FIG. 11 shows the speed of charging at 1C, 2C and 3C performed on a LMO/Graphite Swagelok cell with a rotating magnetic field and with a permanent a magnetic field.

FIG. 11 shows results of testing Swagelok cell 51. The Swagelok cell 51 has dimensions of 5 cm by 2.5 cm. The Swagelok cell 51 is commercially available as a LMO/Graphite Swagelok cell.

The rate of charge of the Swagelok cell 51 is shown in FIG. 11 for charge cycles at 1C, 2C and 3C, each in the presence of a rotating magnetic field and in the presence of a static magnetic field (labelled as no field in the figure). The rotating magnetic field had a speed of 1100 rpm.

As can be seen in FIG. 11, the rate of charging was consistently increased by the rotation of the magnetic field.

Figure 12:
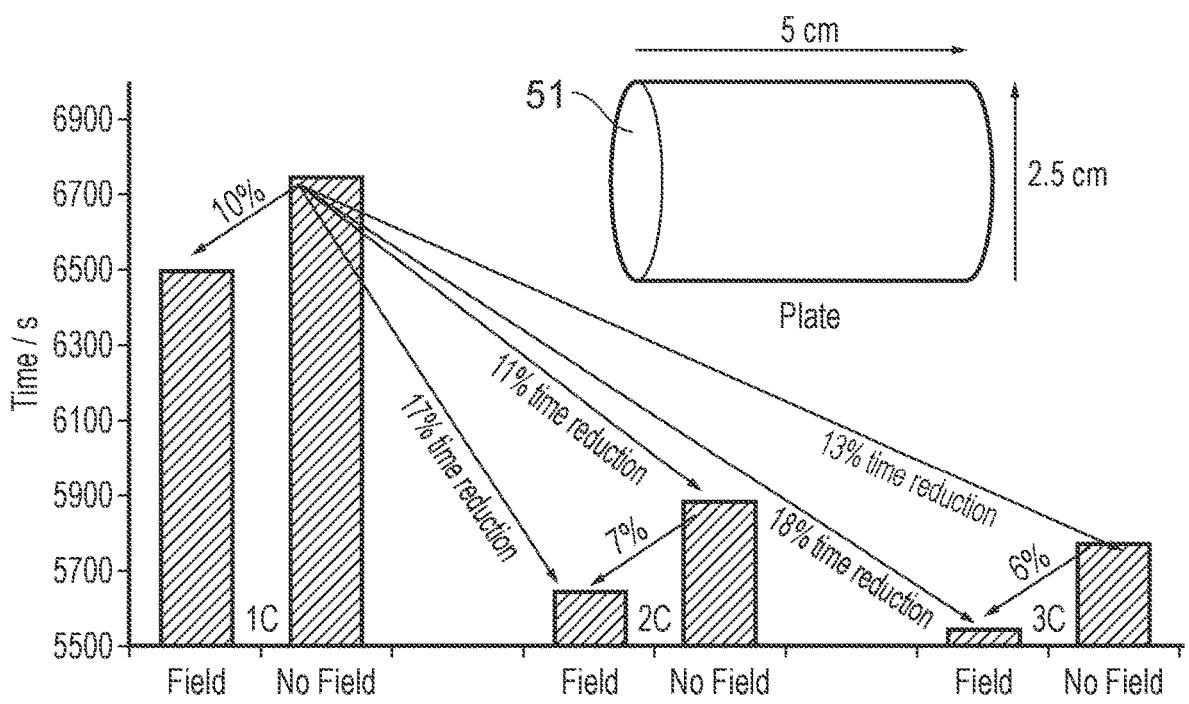
FIG. 12 shows the time taken to charge the LMO/Graphite Swagelok cell of FIG. 11 with a rotating magnetic field and with a permanent magnetic field at 1C, 2C and 3C along with the dimensions of the cell used.

FIG. 12 shows the time taken to charge Swagelok cell 51 in charge cycles at 1C, 2C and 3C, each in the presence of a rotating magnetic field and in the presence of a static magnetic field (labelled as no field in the figure). As can be seen in FIG. 12, the time taken to charge the cell 51 is consistently decreased in the presence of a rotating magnetic field.

Figure 13A:
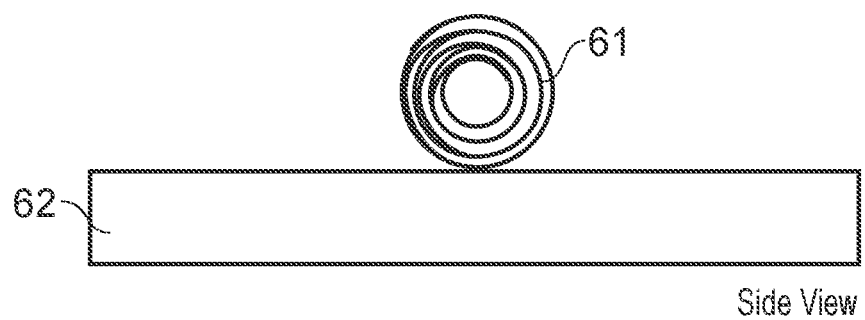
FIG. 13A shows a cross-sectional view along line A-A.
Figure 13B:
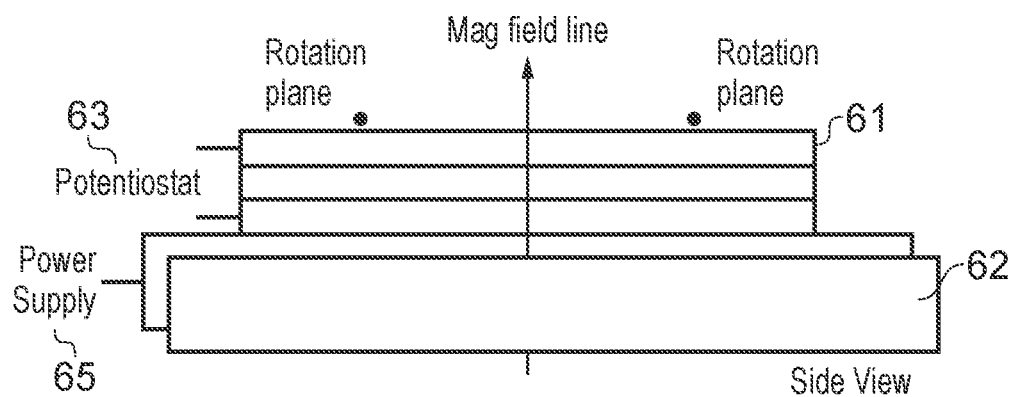
FIG. 13B shows a cross-sectional side view along line B-B and FIG. 13C shows a top view.
Figure 13C:
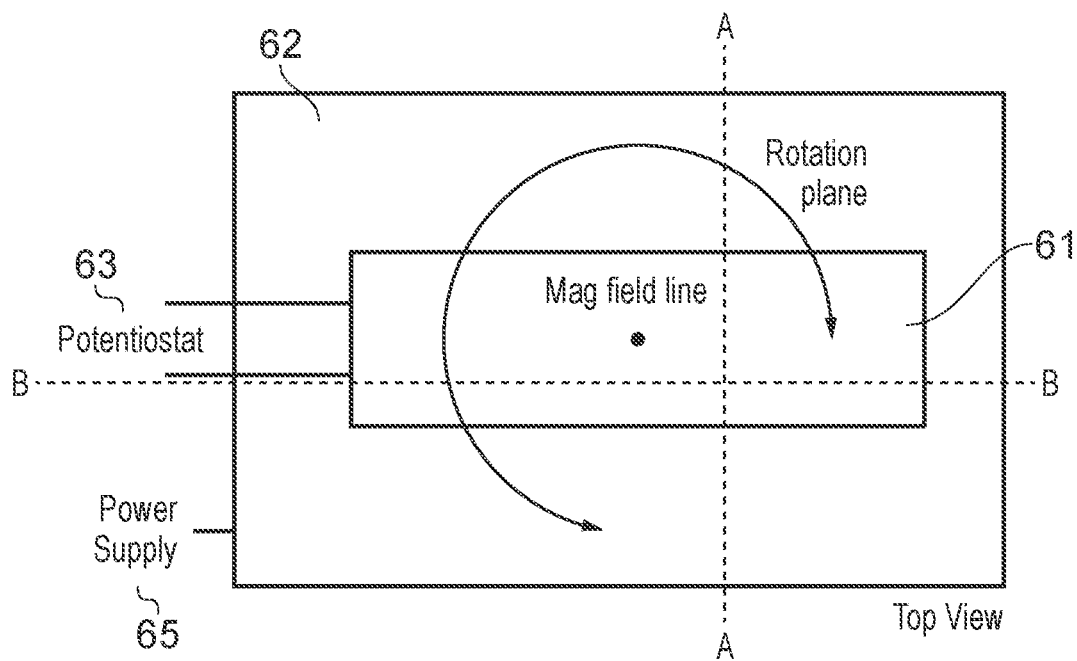

FIG. 13 shows an arrangement used to enhance performance of a cylindrical cell 61. The magnetic field generator 62 produces a magnetic field having the direction parallel to the direction shown by the arrow in FIG. 13B. The magnetic field produced rotates in the direction shown by the arrow in FIG. 13C. The magnetic field passes through cylindrical cell 61.

The cylindrical cell 61 is formed of a first electrode and a second electrode separated from one another by an electrolyte. The electrodes are rolled into a spiral configuration and extend across a length of the cell. The cylindrical cell 61 has contacts for each of the electrodes which may be connected to a potentiostat as shown in FIG. 13.

The cylindrical cell 61 is oriented in FIG. 13 so that the direction of the magnetic field passes through the cross-section of the cylindrical shape, perpendicularly to a direction between the flat ends of the cylindrical shape. The rotation plane of the magnetic field is perpendicular to the planes of the end faces of the cylindrical cell.

As discussed further below, in other embodiments, the cylindrical cell may alternatively be oriented so that the direction of the magnetic field passes through the ends of the cylindrical cell.

The magnetic field be offset from the axis of rotation to ensure that the magnetic flux in the cell changes over time.

The magnetic field generator 62 is an electromagnet powered by power supply 65. Potentiostat 63 is connected to the cylindrical cell 61 and controls the potential over the cell and can be used to charge the cell.

Figure 14:
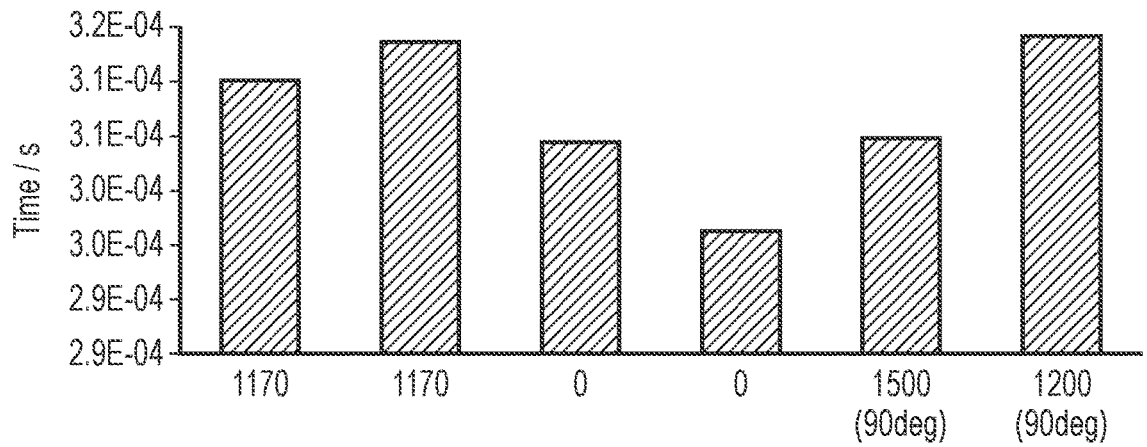
FIG. 14 shows the speed of charging of a cylindrical 2190 mAh LG 18650 cell in cycles with a rotating magnetic field and the cell oriented in two directions 90 degrees apart from one another and with a permanent a magnetic field.

FIG. 14 shows results of testing cylindrical cell 71. The cylindrical cell 71 has dimensions of 6.5 cm by 1.8 cm. The cylindrical cell 51 is commercially available as a cylindrical 2190 mAh LG 18650 cell.

The rate of charge of the cylindrical cell 71 is shown in FIG. 14 for six charge cycles. Cycles 1 and 2 were in the presence of a magnetic field rotating at 1170 rpm, cycle 5 was in the presence of the magnetic field rotating at 1500 rpm and cycle 6 was in the presence of a magnetic field rotating at 1200 rpm. Cycles 3 and 4 were in the presence of a static magnetic field. In cycles 5 and 6, the cylindrical cell was positioned so at an orientation 90 degrees from the position shown in FIG. 13A so that a flat end of the cell faces the magnetic field generator 62.

As can be seen in FIG. 14, the rate of charging was generally higher in the presence of a rotating magnetic field.

Figure 15:
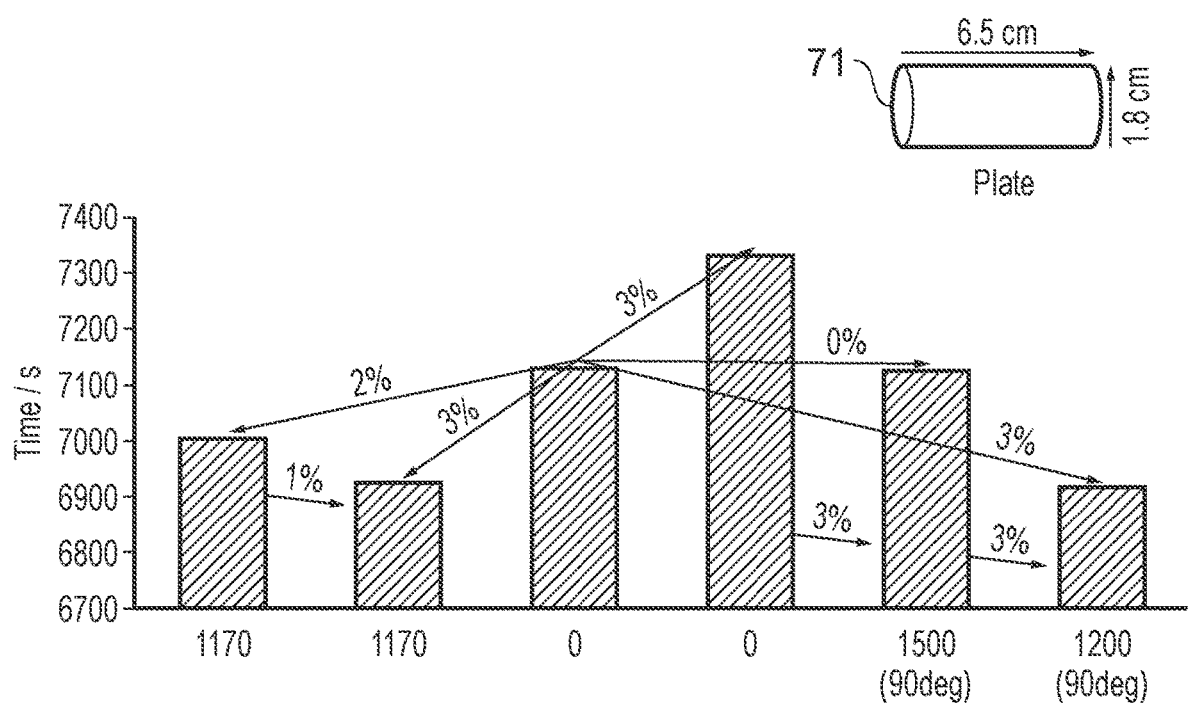
FIG. 15 shows the time taken to charge the cylindrical 2190 mAh LG 18650 cell of FIG. 14 with a rotating magnetic field and the cell oriented in two directions 90 degrees apart from one another and with a permanent a magnetic field.

FIG. 15 shows the time taken to charge cylindrical cell 71 in the charge cycles of FIG. 14. As can be seen in FIG. 15, the time taken to charge the cell 71 was generally lower in the presence of a rotating magnetic field.

The principle of improved transport of ions resulting in improved charging speed and/or increased capacity within an electrochemical cell exhibited by the examples above may be explained by a reduction in activation energy as explained below for an example of a positive ion cell.

The ion velocity, v, within a liquid electrolyte will increase until overcome by drag forces, $F_D$. The electric field force, $F_E$, which drives the motion of the ion can be described by:

$$F_E = z_i q \frac{dv}{dx} \qquad \text{eq. 1}$$

$z_i$ charge number of the ion
q fundamental charge of an electron ($1.6 \times 10^{-19}$C)
dV voltage differential
dx spatial differential
The drag force can be approximated from Stoke's law as:

$$F_D = 6\pi\mu r v \qquad \text{eq. 2}$$

μ viscosity of the liquid
r radius of the ion
v velocity of the ion
Equating the electric and drag forces determines the terminal velocity of the ion, thus mobility, $u_i$:

$$F_E = F_D = 6\pi\mu r v = z_i q \frac{dv}{dx} \qquad \text{eq. 3}$$

$$u_i = \left|\frac{v}{dv/dx}\right| = \frac{|z_i|q}{6\pi\mu r} \qquad \text{eq. 4}$$

The mobility influences the conductivity through the equation:

$$\sigma_i(|z_i|F)c_i u_i \qquad \text{eq. 5}$$

$c_i$ molar concertation

Therefore:

$$F_z \propto u_i \propto \sigma_i \qquad \text{eq. 6}$$

In a polymer electrolyte the Ohmic resistance, σ, can be described by:

$$\sigma T = A_{PEM} \exp\left(\frac{-\Delta G_{act}}{FkT}\right) \qquad \text{eq. 7}$$

$\Delta G_{act}$ activation energy
F Faraday constant
k Boltzman constant
T Temperature Therefore:

$$F_E \propto u_i \propto \sigma_i \propto \exp(-\Delta G_{act}) \qquad \text{eq. 8}$$

The Maxwell-Faraday equation predicts that a time varying magnetic field, δB/δt, will always accompany a spatially-varying, non-conservative electric field, E(r, t), described by:

$$\nabla \times E(r, t) = -\frac{\delta B(r, t)}{\delta t} \qquad \text{eq. 9}$$

∇ Curl operator (infinitesimal rotation of a 3-dimensional vector field)
r position
t time And the electric field, E, at a given point is defined as the vector electric field force, $F_E$, for a given charge, q:

$$F_E = qE \qquad \text{eq. 10}$$

Therefore, the magnetic field influences the activation energy as:

$$B \propto E \propto F_E \propto u_i \propto \sigma_i \propto \exp(-\Delta G_{act}) \qquad \text{eq. 11}$$

Finally conductivity is related to cell resistivity, $\rho_i$, thus Ohmic potential losses, $\eta_{ohmic}$, via:

$$\sigma_i = \frac{1}{\rho_i} \propto \eta_{ohmic} \qquad \text{eq. 12}$$

So, in the presence of a magnetic field, a polymer membrane conducting positive ions will experience a reduced Ohmic potential losses through a net reduction in the activation energy related to the ionic mobility associated with proton transport.

$$B \propto \eta_{ohmic} \qquad \text{eq. 13}$$

The magnetic field can be produced using a permanent magnet or an electromagnet.

Using a permanent magnet, in the presence of a magnetic field, a polymer membrane conducting positive ions will experience a reduced Ohmic potential losses through a net reduction in the activation energy $$F = \frac{B^2 A}{2\mu_0} \qquad \text{eq. 14}$$

B magnetic induction
A cross-sectional area of plunger
$\mu_0$ permeability of space Using an electromagnet, in the presence of a magnetic field, a polymer membrane conducting positive ions will experience a reduced Ohmic potential losses through a net reduction in the activation energy:

$$F = \frac{CAnI}{l} \qquad \text{eq. 15}$$

C proportionality constant
A cross-sectional area of plunger
n number of turns in the solenoid
I current
l length of the solenoid The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of enhancing performance of an electrochemical cell having a first electrode and a second electrode and electrolyte between the first and second electrodes, the first and second electrodes defining a current flow path, the method comprising providing, in addition to the electrochemical cell, a magnetic field generator for providing a changing magnetic field through the cell, the magnetic field generator comprising an array of electromagnets, wherein the method further comprises sequentially activating the electromagnets to provide the changing magnetic field.

2. A method according to claim 1, wherein the changing magnetic field has a direction with a component perpendicular to the current flow path.

3. A method according to claim 1, wherein the changing magnetic field is a rotating magnetic field.

4. A method according to claim 1, wherein the changing magnetic field is an oscillating magnetic field.

5. A method according to claim 1, wherein the changing magnetic field is a pulsing magnetic field.

6. A method according to claim 1, wherein the magnetic field rotates around an axis parallel to the current flow path.

7. A method according to claim 1, wherein the electrochemical cell is a battery.

8. A method according to claim 6, wherein the battery is a positive ion battery and the current flow path is the direction of travel of positive ions.

9. A method according to claim 1, wherein the electrolyte is organic.

10. A charge accelerator for enhancing performance of an electrochemical cell, the device being configured to carry out the method of claim 1.

11. A method of charging an electrochemical cell comprising the steps of providing a current or voltage to the cell from a power source whilst performing the method of claim 1.

12. A method of discharging an electrochemical cell comprising the steps of extracting a current or voltage from the cell whilst performing the method of claim 1.

13. A method of enhancing capacity of an electrochemical cell comprising the steps of forming an electrochemical cell whilst performing the method of claim 1.

14. A method of enhancing capacity of an electrochemical cell comprising the steps of charging or discharging an electrochemical cell whilst performing the method of claim 1.

* * * * *